(12) United States Patent
Tang et al.

(10) Patent No.: US 10,135,959 B2
(45) Date of Patent: Nov. 20, 2018

(54) ELECTRONIC DEVICE HOUSING AND MANUFACTURING METHOD THEREOF BY DIE-CASTING AN ALUMINUM ALLOY

(71) Applicants: DONGGUAN JANUS PRECISION COMPONENTS COMPANY LIMITED, Guangdong (CN); DONGGUAN JANUS ELECTRONIC PRECISION COMPONENTS CO., LTD, Guangdong (CN)

(72) Inventors: Zhen Tang, Guangdong (CN); Xi Fan, Guangdong (CN); Shoude Xie, Guangdong (CN); Changming Wang, Guangdong (CN); Yunbin Li, Guangdong (CN); Kaifu Liu, Guangdong (CN); Shenghui Zhou, Guangdong (CN); Xu Lu, Guangdong (CN)

(73) Assignees: GUANGDONG JANUS INTELLIGENT GROUP CORP., LTD, Guangdong (CN); DONGGUAN JANUS ELECTRONIC PRECISION COMPONENTS CO. LTD., Guangdong (CN)

( * ) Notice: Subject to any disclaimer, the term of this patent is extended or adjusted under 35 U.S.C. 154(b) by 0 days.

(21) Appl. No.: 15/552,236

(22) PCT Filed: Aug. 31, 2015

(86) PCT No.: PCT/CN2015/088598
§ 371 (c)(1),
(2) Date: Aug. 18, 2017

(87) PCT Pub. No.: WO2016/206189
PCT Pub. Date: Dec. 29, 2016

(65) Prior Publication Data
US 2018/0109657 A1    Apr. 19, 2018

(30) Foreign Application Priority Data

Jun. 24, 2015 (CN) .......................... 2015 1 0359913

(51) Int. Cl.
*H04M 1/02* (2006.01)

(52) U.S. Cl.
CPC ........... *H04M 1/0202* (2013.01); *H04M 1/02* (2013.01)

(58) Field of Classification Search
CPC .......... H04B 1/3888; H05K 5/04; H05K 5/00; H05K 5/0004; H05K 5/0217; C22C 1/002;
(Continued)

(56) References Cited

U.S. PATENT DOCUMENTS

2007/0155445 A1* 7/2007 Cho .................... H04M 1/0202
455/575.1
2009/0040703 A1* 2/2009 Gotham .................. H05K 5/02
361/679.02
(Continued)

FOREIGN PATENT DOCUMENTS

CN    202059459    11/2011
CN    102811264    12/2012
(Continued)

*Primary Examiner* — Devan Sandiford
(74) *Attorney, Agent, or Firm* — Weiss & Moy, P.C.; Jeffrey D. Moy

(57) ABSTRACT

An electronic device housing (100) comprises outer frame (10) and a die casting inner frame (20). The die casting inner frame is shaped by means of die casting and is jogged in the outer frame. The present invention also comprises a method for manufacturing the electronic device housing.

7 Claims, 8 Drawing Sheets

(58) Field of Classification Search
CPC .......... C22C 2001/1047; C22C 29/065; C22C 32/0063; C22C 45/001; C22C 45/02; C22C 45/04; C22C 45/10; C22C 47/12; C22C 49/06; H04M 1/0249; H04M 1/0202

See application file for complete search history.

(56) References Cited

U.S. PATENT DOCUMENTS

| | | | | |
|---|---|---|---|---|
| 2009/0041988 | A1* | 2/2009 | Ho | C25D 11/04 428/172 |
| 2011/0186325 | A1* | 8/2011 | Myers | G06F 1/1626 174/50 |
| 2013/0318766 | A1* | 12/2013 | Kiple | B23P 11/00 29/428 |
| 2015/0021064 | A1* | 1/2015 | Wang | H05K 5/0243 174/50 |
| 2015/0050968 | A1* | 2/2015 | Jeon | C25D 5/48 455/575.1 |
| 2016/0355915 | A1* | 12/2016 | Kadali | B22D 15/00 |
| 2016/0373154 | A1* | 12/2016 | Barbarossa | H04B 1/3888 |
| 2017/0078460 | A1* | 3/2017 | Lee | H04M 1/0249 |
| 2017/0121802 | A1* | 5/2017 | Kamat | C22F 1/053 |

FOREIGN PATENT DOCUMENTS

| | | |
|---|---|---|
| DE | 10034701 | 1/2002 |
| KR | 10-2015-0040631 | 4/2015 |

\* cited by examiner

ELECTRONIC DEVICE HOUSING AND MANUFACTURING METHOD THEREOF BY DIE-CASTING AN ALUMINUM ALLOY

FIELD OF THE INVENTION

The present disclosure relates to housing structures, and more particularly relates to a housing of an electronic device and a manufacturing method thereof.

BACKGROUND OF THE INVENTION

Aluminum alloys are commonly used in the manufacture of housings of mobile electronic devices such as mobile phones, due to its good thermal conductivity and mechanical strength. Although this aluminum alloy housing can obtain a better appearance by subjecting to an anodic surface treatment, it usually cannot be manufactured by die-casting, but must be manufactured by extruding or numerical control processing from forged blanks, which results in a significant increase in costs and a significant reduction in efficiency. On the other hand, as for aluminum alloy housings with good die-casting properties, although they can form a frame structure by die casting, they usually cannot be subjected to the anodic surface treatment to obtain a better appearance due to the existence of chromatic aberration and other reasons.

SUMMARY OF THE INVENTION

Accordingly, it is necessary to provide a housing of an electronic device with good appearance and a manufacturing method thereof with high production efficiency.

A housing of an electronic device includes:
a outer frame, and
a die-casting metal inner frame, wherein the die-casting inner frame is formed by die casting and is embedded in the outer frame.

A method of manufacturing a housing of an electronic device, comprising the following steps of:
forming an outer frame;
die-casting a metal die-casting metal inner frame in the outer frame, the die-casting inner frame being embedded in the outer frame; and
subjecting an outer surface of the outer frame to anodic oxidation to form the housing of the electronic device.

The housing of the electronic device employs the outer frame and the die-cast metal inner frame, such that a better appearance can be obtained while using die-casting molding, thus reducing the manufacturing process and improving the production efficiency.

BRIEF DESCRIPTION OF THE DRAWINGS

To illustrate the technical solutions according to the embodiments of the present invention or in the prior art more clearly the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

Figure 1:
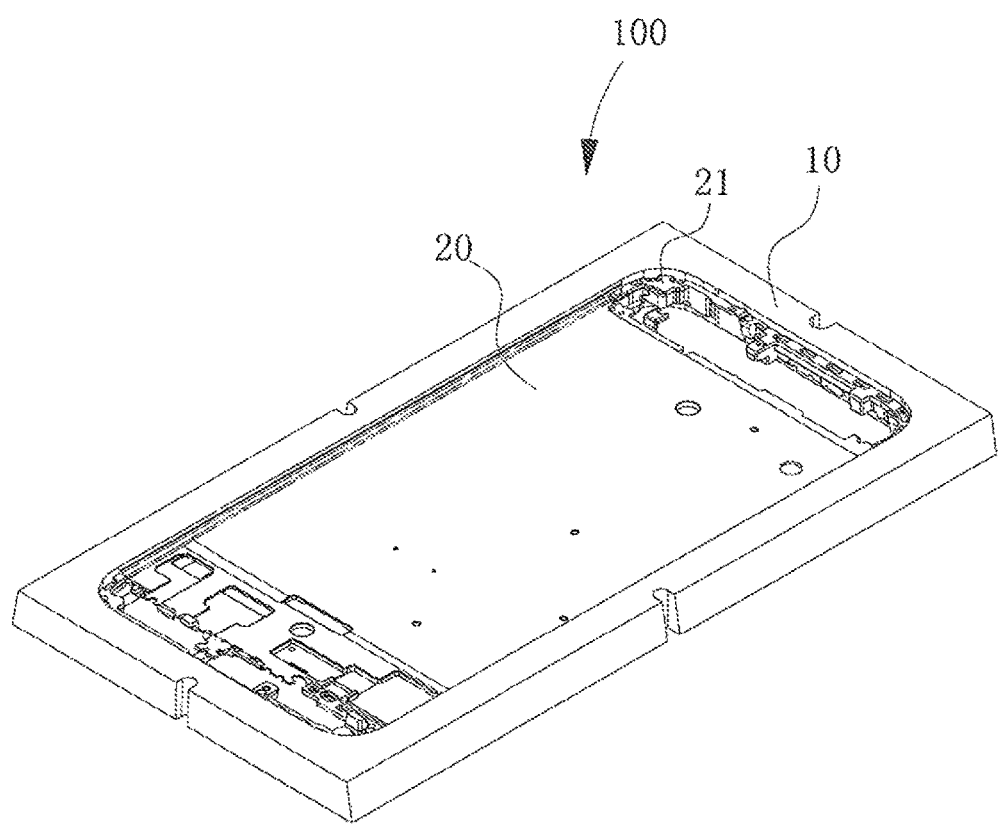
FIG. 1 is a perspective view of a housing of an electronic device according to an embodiment.

Embodiments of the invention are described more fully hereinafter with reference to the accompanying drawings. The various embodiments of the invention may, however, be embodied in many different forms and should not be construed as limited to the embodiments set forth herein. Rather, these embodiments are provided so that this disclosure will be thorough and complete, and will fully convey the scope of the invention to those skilled in the art. Elements that are identified using the same or similar reference characters refer to the same or similar elements.

It will be understood that when an element is referred to as being "connected" or "coupled" to another element, it can be directly connected or coupled to the other element or intervening elements may be present. In contrast, if an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. The term "and/or" as used herein includes any and all combinations of one or more of the associated listed items.

Referring to FIG. 1, a housing 100 of an electronic device according to an embodiment includes an outer frame 10 and a die-casting metal inner frame 20. The die-casting metal inner frame 20 is formed by die casting and is embedded in the outer frame 10. The housing 100 of an electronic device can be a frame structure for a mobile phone or other electronic products. The outer frame 10 made of anodized die-cast aluminum, zinc alloy, stainless steel or other commonly used metal material, or made of ceramic materials. The die-casting metal inner frame 20 may be made of magnesium alloy, die-cast aluminum, and die-cast aluminum for treatment. In the illustrated embodiment, the outer frame 10 is made of die-cast aluminum alloy adapted for anodic oxidation treatment, and the die-casting metal inner frame 20 may be made of aluminum alloy material having good die-casting performance.

Figure 2:
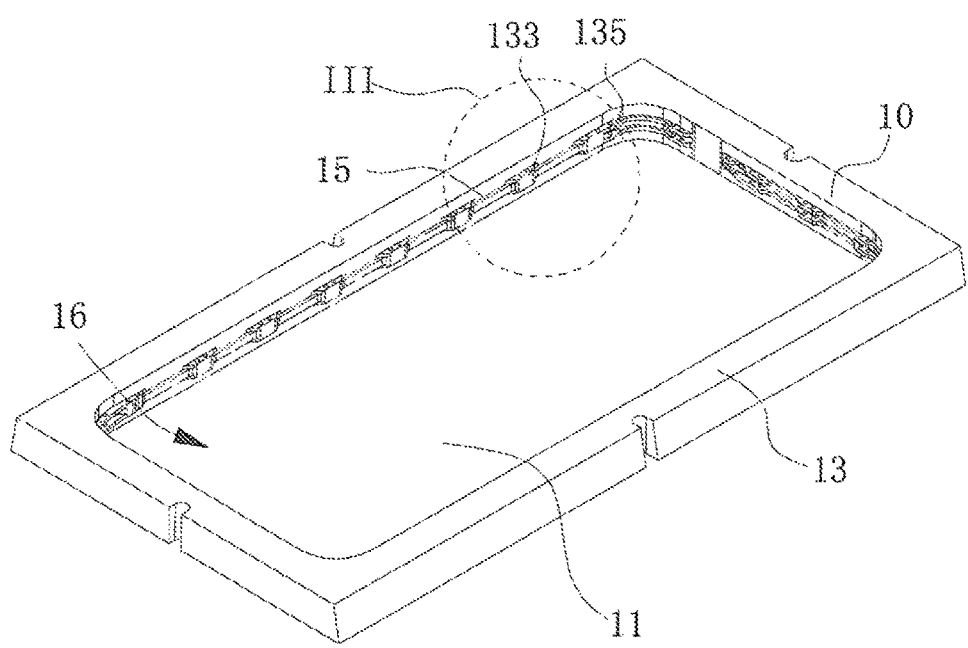
FIG. 2 is a perspective view of an outer frame of the housing of the electronic device of FIG. 1.
Figure 3:
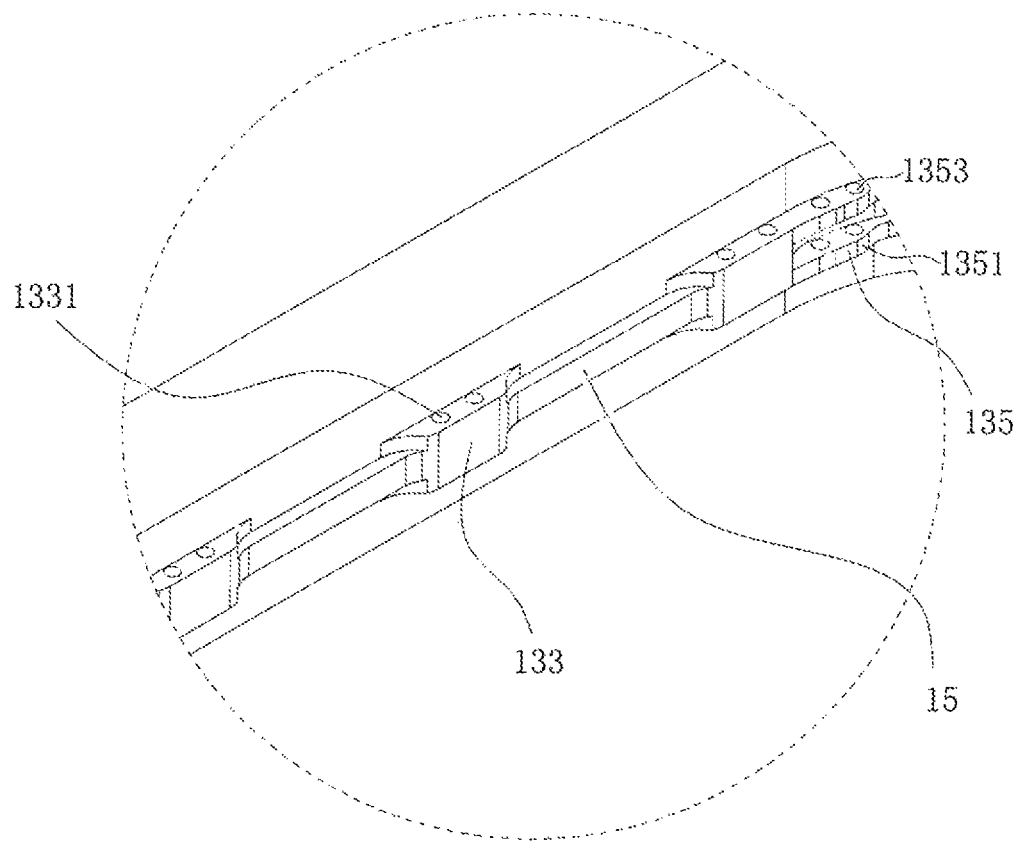
FIG. 3 is an enlarged view of portion II in FIG. 2.
Figure 4:
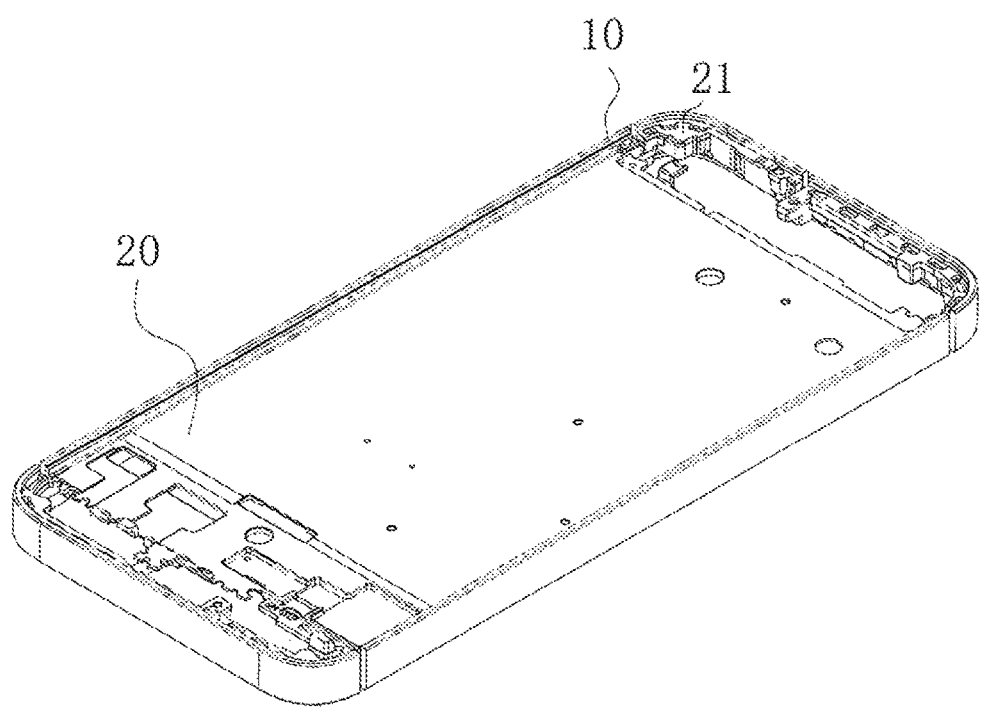
FIG. 4 is a perspective view of the housing of the electronic device of FIG. 1 after removing margins.

Referring to FIG. 2, the outer frame 10 has an outer surface subjected to an anodic oxidation treatment. The out frame 10 further includes a base plate 11, a side plate 13, and a engaging portion 15. The base plate 11 is a substantially rectangular plate with four corners (not labeled). The side plate 13 surrounds the base plate 11, and the side plate 13 and the base plate 11 cooperatively forms a cavity 16. The side plate 13 further includes a plurality of spaced buckling portions 133 and a plurality of latching portions 135. The engaging portion 15 is formed on a side of the side-plate 13 facing the cavity 16, and the engaging portion 15 extends along a longitudinal direction of the side plate 13. In the illustrated embodiment, along a width direction of the side plate 13, the engaging portion 15 is located at a middle portion of the side plate 13 and has a width less than that of the side plate 13. Of course, in alternative embodiments, the engaging portion 15 can be located on other positions of the side plate 13 according to needs.

The plurality of buckling portions 133 and the plurality of latching portions 135 are formed on the engaging portion 15. The plurality of latching portions 135 are formed on the engaging portion 15 and are aligned with corner positions of the base plate 11. The buckling portion 133 protrudes from the engaging portion 15, and the buckling portion 133 has a greater width than that of the engaging portion 15. The buckling portion 133 defines two spaced buckling holes 1331 extending perpendicular to an extending direction of the engaging portion 15. The buckling hole 1331 penetrates through the buckling portion 133. The latching portion 135 includes two latching strips 1351 extending from a side of the buckling portion 133. The two latching strips 1351 are spaced apart from each other in a width direction of the side plate 13. The latching strip 1351 is bent at the corner position of the base plate 11, and both ends of the latching strip 1351 are aligned with adjacent edges of the base plate 11. Extension lines of both ends of the latching strip 1351 are perpendicular to each other. Both ends of the latching strip 1351 define two latching holes 1353, respectively. The two latching holes 1353 are spaced arranged and penetrate through the ends of the latching strip 1351, and two latching holes 1353 formed on one latching strip 1351 are in communication with two latching holes 1353 formed on the other latching strip 1351. In the illustrated embodiment, the outer frame 10 is made of silicon-containing aluminum alloy material, where the content of the silicon is less than 0.1 wt %.

The die-casting metal inner frame 20 is shaped as a rectangular plate, which is received and fixed in the cavity 16 of the outer frame 10. The die-casting inner frame 20 is formed on the outer frame 10 by die casting, and the die-casting inner frame 20 includes an embedding structure 21 which is tightly embedded with the engaging portion 15, the plurality of buckling portions 133, and the plurality of latching portions 135 of the outer frame 10.

Figure 5:
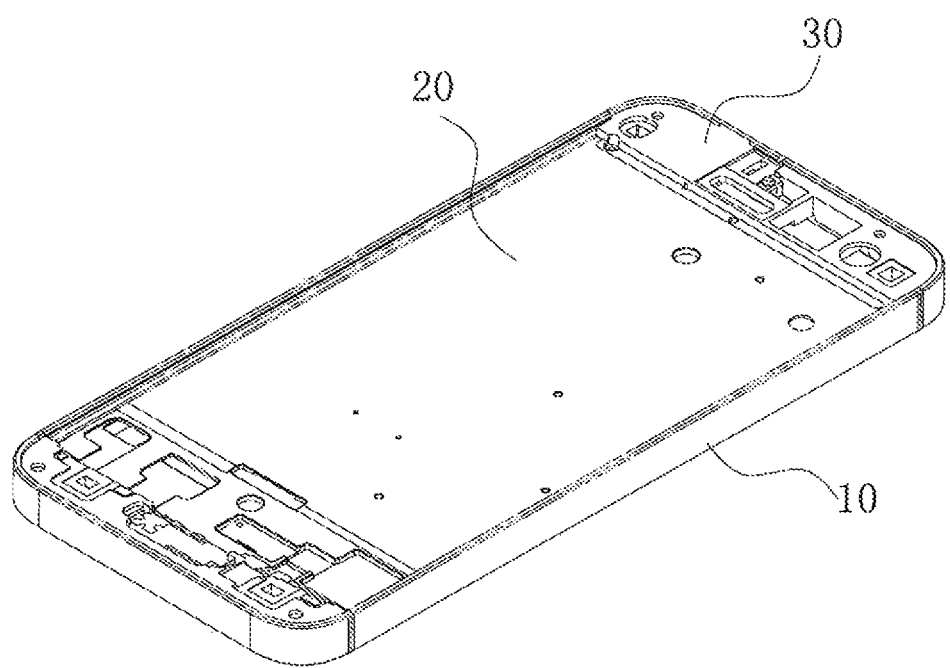
FIG. 5 is a perspective view of the housing of the electronic device of FIG. 4 after a plastic member is mounted.

Referring to FIG. 5, in an embodiment, the housing 100 of an electronic device further includes a plastic member 30 formed in the outer frame 10 and engaging the die-casting metal inner frame 20. The outer frame 10 and the die-casting inner frame 20 define micropores of micro nanometer level, and the plastic member 30 is formed on the outer frame 10 and the die-casting metal inner frame 20 by injection molding. The plastic member 30 is engaged in the micropores of micro nanometer level.

Figure 6:
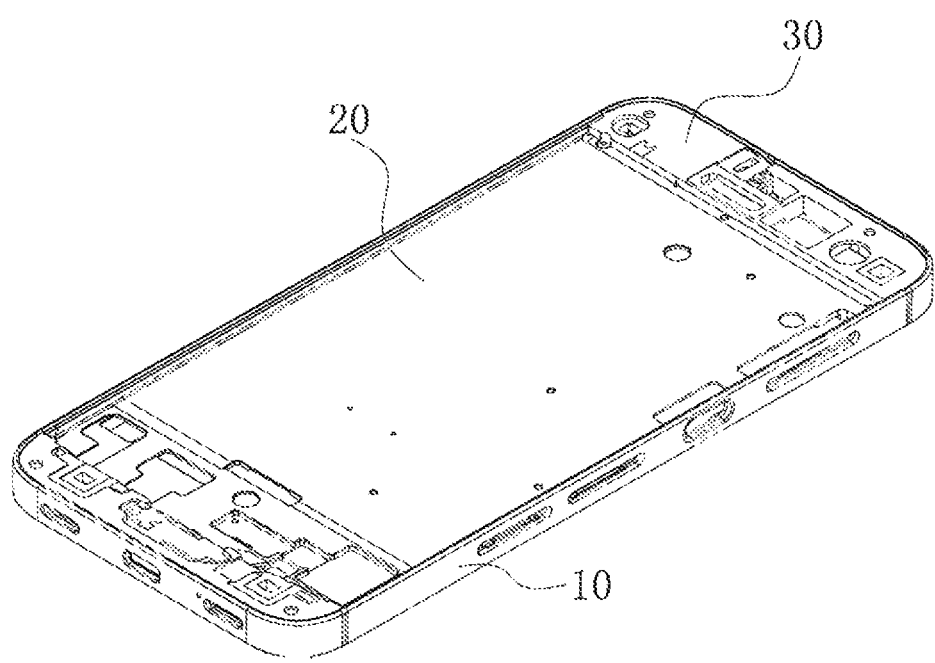
FIG. 6 is a perspective view of the final obtained housing of the electronic device of FIG. 5.

Referring to FIG. 6, in one embodiment, the housing 100 of the electronic device further defines a keyhole, and forms such structures as an antenna break point, an antenna contact, and a ground point.

Figure 7:
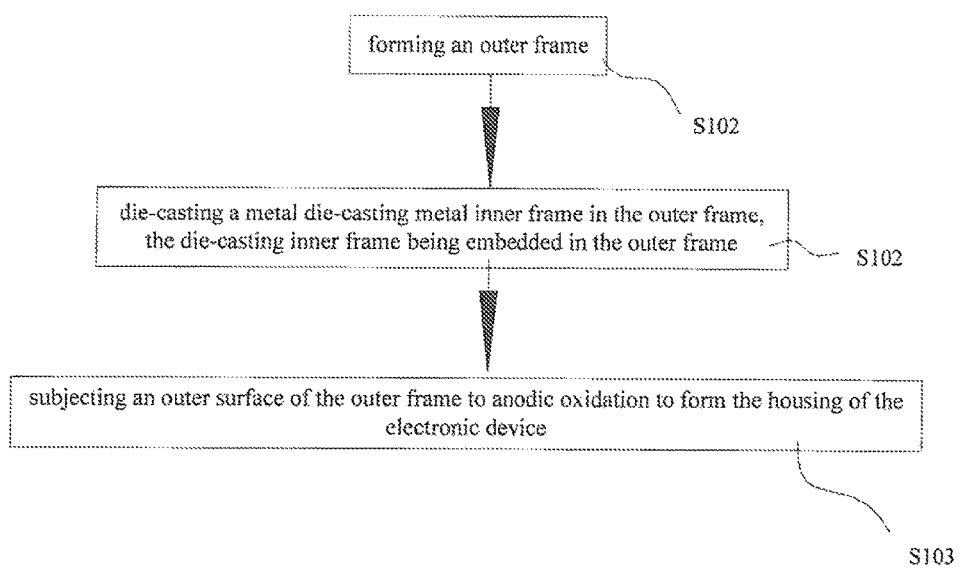
FIG. 7 is a flowchart of a method of manufacturing a housing of an electronic device according to an embodiment.

Referring to FIG. 7, a method of manufacturing a housing of an electronic device according to an embodiment includes the following steps of:

In step S101, an outer frame 10 is formed. The outer frame 10 may be formed by, for example, extruding, forging or computer numerical control (CNC) machining from a metal material.

Specifically, a base plate 11, a side plate 13, and an engaging portion 15 are machined from the metal material. The base plate 11 is substantially rectangular plate with four corners. The side plate 13 surrounds the base plate 11, and the side plate 13 and the base plate 11 cooperatively forms a cavity 16. The engaging portion 15 is formed on a side of the side plate 13 facing the cavity 16, and the engaging portion 15 extends along a longitudinal direction of the side plate 13. Along a width direction of the side plate 13, the engaging portion 15 is located at a middle portion of the side plate 13 and has a width less than that of the side plate 13. The side plate 13 further includes a plurality of buckling portions 133 and a plurality of latching portions 135 formed on the engaging portion 15. The plurality of buckling portions 133 are spaced formed on the engaging portion 15, and the plurality of latching portions 135 are formed on the engaging portion 15 and are aligned with corner positions of the base plate 11. The buckling portion 133 protrudes from the engaging portion 15, and the buckling portion 133 has a greater width than that of the engaging portion 15. The buckling portion 133 defines two spaced buckling holes 1331 extending perpendicular to an extending direction of the engaging portion 15. The buckling hole 1331 penetrates through the buckling portion 133. The latching portion 135 includes two latching strips 1351 extending from a side of the buckling portion 133. The two latching strips 1351 are spaced apart from each other in a width direction of the side plate 13. The latching strip 1351 is bent at the corner position of the base plate 11, and both ends of the latching strip 1351 are aligned with adjacent edges of the base plate 11, i.e., extension lines of both ends of the latching strip 1351 are perpendicular to each other. Both ends of the latching strip 1351 define two latching holes 1353, respectively. The two latching holes 1353 are spaced arranged and penetrate through the ends of the latching strip 1351, and two latching holes 1353 formed on one latching strip 1351 are in communication with two latching holes 1353 formed on the other latching strip 1351. In the illustrated embodiment, the outer frame 10 is made of silicon-containing aluminum alloy material, where the content of the silicon is less than 0.1 wt %.

In step S102, a die-casting metal inner frame 20 is die-cast in the outer frame 10.

Specifically, the outer frame 10 is placed in a die-casting mold (not shown), the metal material is die-cast into the cavity 16 of the outer frame 10, so as to form the die-casting metal inner frame 20. The step of die-casting further includes forming an embedding structure 21 which is tightly embedded with the engaging portion 15, the plurality of buckling portions 133, and the plurality of latching portions 135 of the outer frame 10.

In step S103, an outer surface of the outer frame 10 is subjected to anodic oxidation to form the housing 100 of the electronic device.

Figure 8:
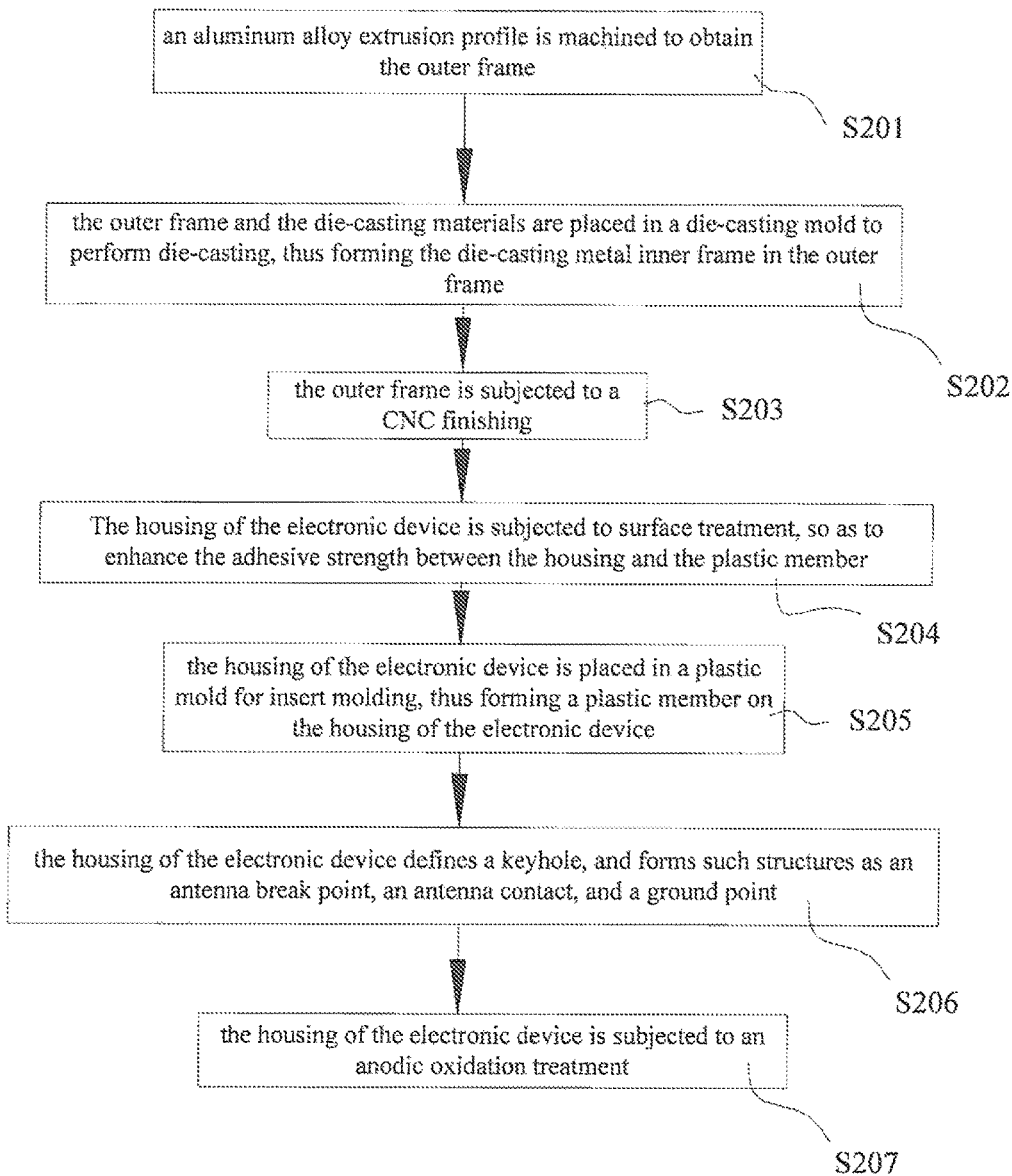
FIG. 8 is a flowchart of a method of manufacturing a housing of an electronic device according to another embodiment.

Referring to FIG. 8, a method of manufacturing a housing of an electronic device according to another embodiment includes the following steps of:

In step S201, an aluminum alloy extrusion profile is machined to obtain the outer frame 10.

Specifically, the aluminum alloy extrusion profile is machined into an outer frame blank while peripheral machining allowance is reserved. The outer frame blank is subjected to stamping and CNC finishing, so as to form the buckling portion 133 and the latching portion 135 on the outer frame 10, thus facilitating the close engagement between the outer frame 10 and the die-casting metal inner frame 20. It should be understood that, the buckling portion 133 and the latching portion 135 on the outer frame 10 can be substituted by other structures.

In step S202, the outer frame 10 and the die-casting materials are placed in a die-casting mold to perform die-casting, thus forming the die-casting metal inner frame 20 in the outer frame 10. The housing 100 of the electronic device is then formed by close engagement of the die-casting metal inner frame 20 and the outer frame 10.

In step S203, the outer frame 10 is subjected to a CNC finishing, which facilitates subsequent plastic injection molding.

In step S204, the housing 100 of the electronic device is subjected to surface treatment, so as to enhance the adhesive strength between the housing 100 and the plastic member.

Specifically, microporres of micro nanometer level are etched on a surface of the housing 100 of the electronic device. The micopores can be formed by processing the outer frame 10 and the die-casting metal inner frame 20 using chemical etching or electrochemical etching. Of course, the outer frame 10 and the die-casting metal inner frame 20 can also be processed by other surface treatment methods such as passivation, so as to enhance the adhesive effect between the plastic member 30 and the outer frame 10 and the die-casting metal inner frame 20.

In step S205, the housing 100 of the electronic device is placed in a plastic mold for insert molding, thus forming a plastic member 30 on the housing 100 of the electronic device. The plastic member 30 is bonded to the inside of the outer frame 10 and is bonded to the die-cast metal inner frame 20.

In step S206, the housing 100 of the electronic device defines a keyhole, and forms such structures as an antenna break point, an antenna contact, and a ground point. And, the housing 100 of the electronic device is subjected to CNC finishing to remove the margin for the assembly size.

In step S207, the housing 100 of the electronic device is subjected to an anodic oxidation treatment. After the anodic oxidation treatment, the housing 100 of the electronic device exhibits a good appearance.

It should be understood that, the steps of CNC finishing of the outer frame 10, etching micopores, insert molding of the plastic member 30 can be omitted.

The housing 100 of the electronic device is composed of an outer frame 10 suitable for anodic oxidation treatment and a die-cast metal inner frame 20, such that the manufacturing process and the manufacturing cost are reduced while a better appearance is obtained due to the die casting process.

The housing 100 of the electronic device not only can facilitate anodic oxidation treatment to the outer frame 10, but also can reduce the overall shaping capacity of the frame, and processing capacity of the CNC and other ancillary processes. Meanwhile, the housing 100 can also reduce the cost of expensive CNC machine occupancy therefore it has high overall yield, is easy to mass production, and significantly improve the production efficiency. On the one hand, using the outer frame 10 suitable for anodic oxidation treatment can facilitate the appearance structure to be subjected to anodic oxidation. On the other hand, the die-cast metal inner frame 20 die cast in the outer frame 10 can reduce processing costs and processing cycles, and improve material utilization. The engaging portion 15 formed on the inner side of the outer frame 10, the plurality of buckling portions 133, and the plurality of latching portions 135 can enable at least a portion of the metal die casting material to be die cast on the outer frame 10, such that the die-cast metal inner frame 20 can be tightly formed with the outer frame 10 via these structures. The housing 100 of the electronic device with these structures has a high bonding strength, thus the whole frame is stable and reliable.

Although the description is illustrated and described herein with reference to certain embodiments, the description is not intended to be limited to the details shown. Modifications may be made in the details within the scope and range equivalents of the claims.

What is claimed is:

1. A housing of an electronic device, comprising:
   an outer frame; and
   a die-casting metal inner frame, wherein the die-casting inner frame is formed by die casting and is embedded in the outer frame;
   wherein the outer frame comprises a base plate, a side plate, and an engaging portion, the side plate surrounds an edge of the base plate, the side plate and the base plate cooperatively forms a cavity, the engaging portion is formed on a side of the side plate facing the cavity, the engaging portion extends along a longitudinal direction of the side plate, the die-casting metal inner frame has an embedding structure embedded to the engaging portion;
   wherein the engaging portion is located at a middle portion of the side plate and has a width less than a width of the side plate; the side plate further comprises a plurality of buckling portions formed on the engaging portion, the embedding structure is embedded on the plurality of buckling portions.

2. The housing of the electronic device of claim 1, wherein the outer frame is made of aluminum alloy containing silicon, a mass fraction of the silicon is less than 0.1%, and the outer frame has an outer surface subjected to an anodic oxidation treatment.

3. The housing of the electronic device of claim 1, wherein the plurality of buckling portions are spaced arranged on the engaging portion and protrude outwardly, the buckling portion has a width greater than a width of the engaging portion, each buckling portion defines two spaced buckling holes, the buckling hole extends in a direction perpendicular to an extending direction of the engaging portion, and the buckling hole penetrates through the buckling portion.

4. The housing of the electronic device of claim 1, wherein the plurality of latching portions are corresponding to corner positions of the base plate, and the embedding structure is embedded on the plurality of latching portions.

5. The housing of the electronic device of claim 4, wherein each latching portion comprises two latching strips protruding towards the cavity, the two latching strips are spaced arranged along a width direction of the side plate, each latching strip is bent at the corner position of the base plate, and two ends of the latching strip are aligned with two adjacent edges of the base plate, respectively.

6. The housing of the electronic device of claim 1, wherein the outer frame and the die-casting inner frame define micropores of micro nanometer level; the housing of the electronic device further comprises a plastic member injection-molded in the outer frame and on the die-casting metal inner frame, wherein the plastic member is engaged in the micropores of micro nanometer level.

7. A method of manufacturing a housing of an electronic device, comprising the following steps of:

forming an outer frame;
die-casting a metal die-casting metal inner frame in the outer frame, the die-casting inner frame being embedded in the outer frame; and
subjecting an outer surface of the outer frame to anodic oxidation to form the housing of the electronic device comprising:
  etching micropores of micro nanometer level on a surface of the housing of the electronic device; and
  lacing the housing of the electronic device in a plastic mold for insert molding to form a plastic member on the housing of the electronic device; and
placing the housing of the electronic device in a plastic mold for insert molding to form a plastic member on the housing of the electronic device.

* * * * *